United States Patent
Shewfelt

(10) Patent No.: US 9,295,234 B2
(45) Date of Patent: Mar. 29, 2016

(54) PET SAFETY SYSTEM

(71) Applicant: Carolyn Shewfelt, Coeur D'Alene, ID (US)

(72) Inventor: Carolyn Shewfelt, Coeur D'Alene, ID (US)

(*) Notice: Subject to any disclaimer, the term of this patent is extended or adjusted under 35 U.S.C. 154(b) by 244 days.

(21) Appl. No.: 13/835,831

(22) Filed: Mar. 15, 2013

(65) Prior Publication Data

US 2014/0060453 A1 Mar. 6, 2014

Related U.S. Application Data

(60) Provisional application No. 61/697,144, filed on Sep. 5, 2012.

(51) Int. Cl.
*A01K 27/00* (2006.01)
*A01K 1/02* (2006.01)

(52) U.S. Cl.
CPC ............... *A01K 27/002* (2013.01); *A01K 1/029* (2013.01); *A01K 1/0272* (2013.01)

(58) Field of Classification Search
CPC .............................. A01K 27/00; A01K 27/002
USPC .................................. 119/792, 769, 770, 771
See application file for complete search history.

(56) References Cited

U.S. PATENT DOCUMENTS

| | | | | |
|---|---|---|---|---|
| 4,402,440 A * | 9/1983 | Purtzer et al. | ................. | 224/160 |
| 4,434,920 A * | 3/1984 | Moore | ........................... | 224/160 |
| 5,044,321 A * | 9/1991 | Selph | ............................ | 119/416 |
| 5,813,580 A * | 9/1998 | Fair | ............................... | 224/160 |
| 5,894,817 A * | 4/1999 | Manuel | ......................... | 119/497 |
| 5,915,335 A * | 6/1999 | Holt, Jr. | ........................ | 119/771 |
| 6,637,377 B2 * | 10/2003 | Lobanoff et al. | ............. | 119/792 |
| 6,651,594 B1 * | 11/2003 | Bagwell | ......................... | 119/770 |
| 6,672,493 B1 * | 1/2004 | Fair et al. | ....................... | 224/160 |
| 6,802,282 B2 * | 10/2004 | Muckleroy | .................... | 119/497 |
| 7,017,525 B2 * | 3/2006 | Leach | ............................ | 119/770 |
| 7,284,503 B2 * | 10/2007 | Elmberg | ........................ | 119/770 |
| 7,311,063 B2 * | 12/2007 | Goldberg | ....................... | 119/771 |
| 7,322,498 B2 * | 1/2008 | Frost | .............................. | 224/160 |
| 7,343,881 B2 * | 3/2008 | Schantz et al. | ................. | 119/792 |
| 7,353,779 B2 * | 4/2008 | Altieri | ............................ | 119/770 |
| 7,699,348 B2 * | 4/2010 | Singh | .......................... | 280/801.1 |
| 8,636,181 B2 * | 1/2014 | Gunter et al. | .................. | 224/160 |
| 2005/0076856 A1 * | 4/2005 | Bruck et al. | ................... | 119/770 |
| 2008/0149673 A1 * | 6/2008 | Slater | ............................. | 224/153 |
| 2009/0019621 A1 * | 1/2009 | Radcliffe et al. | ................. | 2/455 |
| 2011/0083615 A1 * | 4/2011 | Aaron et al. | .................. | 119/771 |

OTHER PUBLICATIONS

Shultz, Cara, For Pets—or Babies? When Carriers Get (Too) Maternal), Jun. 23, 2009, peoplepets.com, <http://www.peoplepets.com/people/pets/article/0,,20492676,00.html>.*

* cited by examiner

*Primary Examiner* — Monica Williams
*Assistant Examiner* — Michael Wang

(57) ABSTRACT

A pet carrying system for carrying a pet by a wearer and securing the pet in a vehicle, including a pet harness and a carrier harness. The pet harness includes a pet harness panel and a pet strap coupled configured to selectively secure the pet harness panel to the pet. A pet harness attachment member is coupled to the pet harness panel. The carrier harness includes a carrier harness panel and a carrier harness attachment member coupled to the carrier harness panel and selectively engageable with the pet harness attachment member. A posterior support is coupled to the carrier harness panel and is configured to support a posterior portion of a pet. An anterior support is coupled to the carrier harness panel and is engageable with the posterior support. A carrier strap is coupled to the harness panel and wearable by the user or connectable to the vehicle.

20 Claims, 6 Drawing Sheets

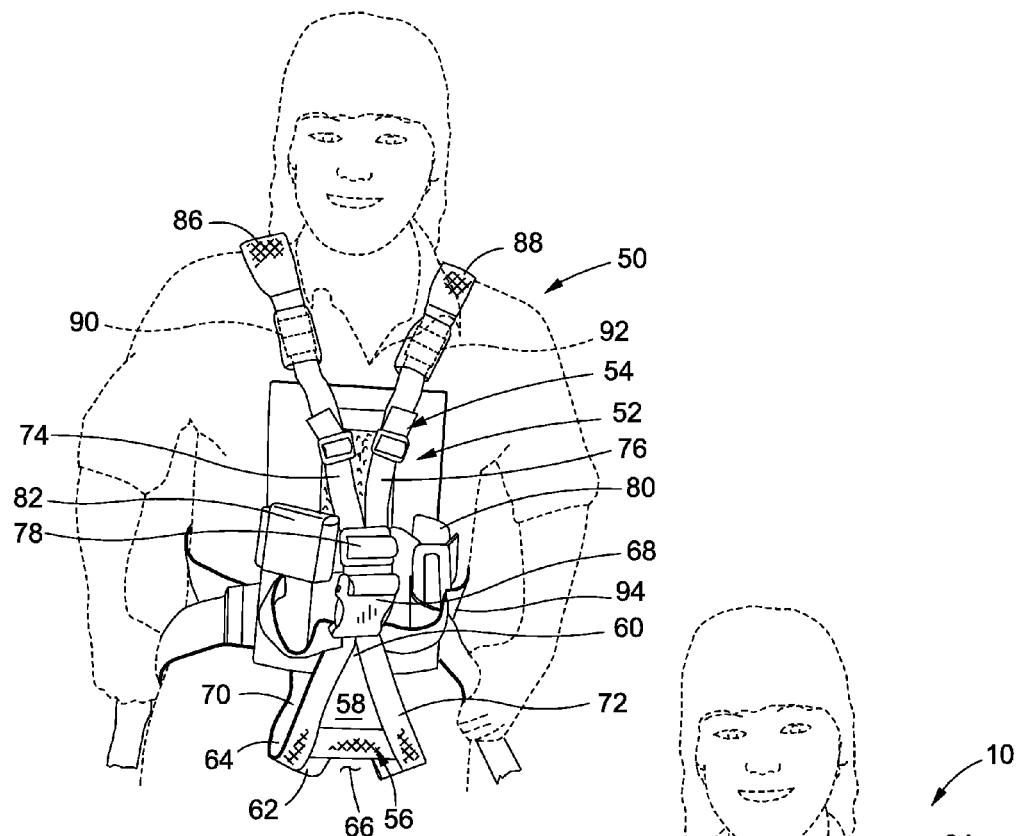
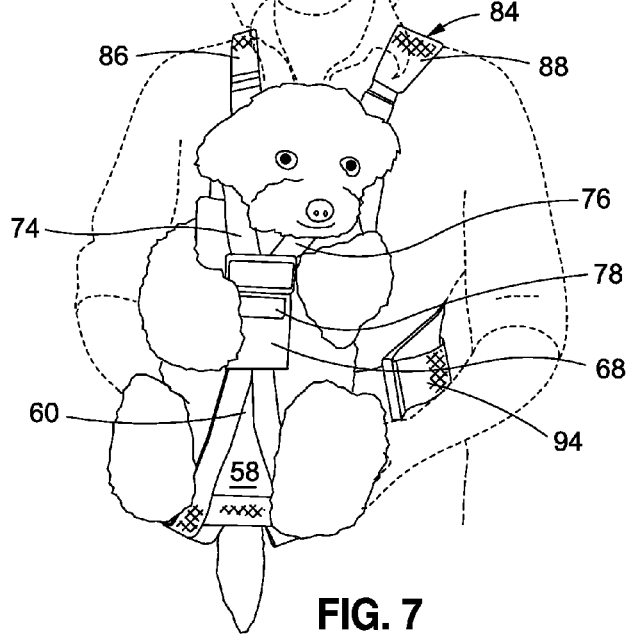

PET SAFETY SYSTEM

CROSS-REFERENCE TO RELATED APPLICATIONS

This United States non-provisional patent application claims the benefit of U.S. Provisional Application Ser. No. 61/697,144, filed Sep. 5, 2012, the contents of which are expressly incorporated herein by reference.

STATEMENT RE: FEDERALLY SPONSORED RESEARCH/DEVELOPMENT (Not Applicable)

BACKGROUND OF THE INVENTION

1. Field of the Invention

The present invention relates generally to a pet safety system, and more specifically to a system which allows a pet caretaker to easily carry the pet, as well as support the pet in a vehicle.

2. Description of the Related Art

Pets provide a great deal of companionship and friendship to their owners, and thus, pet owners have a strong desire to spend as much time as possible with their pet throughout a given day. Although a pet owner can readily interact with their pet while at the owner's residence, the pet owner routinely leaves the residence to run errands and perform other tasks. During such times, the pet may be left alone at the residence while the owner is out.

In some cases, the owner may bring their pet along for the excursion. In this regard, the pet may ride with the owner in the owner's vehicle from their residence to the remote destination. Once the owner reaches the remote destination, the owner has a desire to take the pet with her, if the circumstances allow (e.g., if the destination allows pets to accompany their owners).

Although permitting one's pet to travel with the owner on such outings may allow the owner to experience the companionship provided by the pet, there are inherent safety concerns and potential logistical difficulties which may arise during the course of such outing. For instance, when the pet is in the vehicle, the owner may let the pet roam freely and unrestrained throughout the vehicle. Obviously, a sudden change in speed or a quick turn could cause serious injury to the pet. Moreover, if the pet is roaming freely throughout the vehicle, the pet can easily distract the driver, which may cause an accident. Conversely, if the pet is contained within a cage, the pet may become bored or upset by the unchanging surroundings/scenery.

Furthermore, when the owner arrives at the destination, the circumstances may make it difficult to bring the pet with the owner. If the destination is crowded, it may be challenging to allow the pet to walk, even on a leash. For instance, when a pet owner takes their pet on a subway, the pet owner is oftentimes required to hold the pet due to the confined and crowded conditions typical of subways. When the user holds the pet over an extended period of time, even the smallest of pets may become heavy or restless and try to escape the owner's grasp. In addition, when the pet owner carries the pet in their arms, the user typically cannot carry other items.

Therefore, it is apparent that there is a need in the art for a pet safety system which allows a pet owner to safely and easily carry one's pet and transport one's pet in a vehicle. The present invention addresses this particular need, as will be discussed in more detail below.

BRIEF SUMMARY OF THE INVENTION

According to an aspect of the present invention, there is provided a pet carrying system for carrying a pet by a wearer and for securing the pet in a vehicle. The pet carrying system includes a pet harness and a carrier harness. The pet harness includes a pet harness panel and a pet strap coupled to the harness panel and configured to selectively secure the pet harness panel to the pet. A pet harness attachment member is coupled to the pet harness panel. The carrier harness is selectively securable to the pet harness and includes a carrier harness panel and a carrier harness attachment member coupled to the carrier harness panel and configured to be selectively engageable with the pet harness attachment member. A posterior support is coupled to the carrier harness panel and is configured to support a posterior portion of a pet secured by the carrier harness. An anterior support is coupled to the carrier harness panel and is engageable with the posterior support. A carrier strap is coupled to the harness panel and is configured to be transitional between a wearing configuration, wherein the carrier strap is worn by a wearer, and vehicle configuration, wherein the carrier strap is secured to the vehicle.

The pet carrying system may additionally include a middle restraint coupled to the carrier harness panel and configured to be extendable around a mid-section of the pet to secure the pet to the carrier harness.

The pet carrying system may be transitional between a front wearing configuration, wherein the carrier harness panel is positioned over a wearer's chest, and a back wearing configuration, wherein the carrier harness panel is positioned over a wearer's back.

The pet carrying system may additionally include a waist strap coupled to the carrier harness panel, wherein the waist strap is extendable about the wearer's mid-section to secure the carrier harness to the wearer.

The pet carrying system may further comprise a posterior vehicle connector coupled to the carrier harness panel in spaced relation to the carrier strap and engageable with the vehicle to secure the carrier harness to the vehicle. The posterior vehicle connector may include a seat belt loop coupled to the carrier harness panel and configured to define an opening sized to receive the vehicle seat belt. The posterior vehicle connector may include an anchor strap coupled to the carrier harness panel and securable to an anchor in the vehicle.

The pet carrying system may additionally include a protective covering selectively connectable to the carrier harness panel and configured to be disposable over the pet to cover a portion of the pet. The protective covering may include a covering panel defining a covering periphery that is adjustable to conform to the size of the pet. A hood may be selectively connectable to the protective covering and disposable over the head of the pet.

The pet strap may include a first looped segment disposable about the pet's neck and a second looped segment disposable about the pet's midsection.

The posterior support and the carrier harness panel may collectively define a pair of posterior leg openings sized to receive the posterior legs of the pet. The posterior support and the carrier harness panel may collectively define a tail opening between the pair of posterior leg openings sized to receive the tail of the pet.

The anterior support may define an opening sized to allow the head of the pet to be advanced therethrough.

The pet harness attachment member and the carrier harness attachment member may include complimentary hook and loop fasteners.

The carrier strap may include first and second shoulder straps selectively connectable to the carrier harness panel, and a vehicle strap connectable to the carrier harness panel. The first and second shoulder strap may be connected to the carrier harness panel and the vehicle strap may be disconnected from the carrier harness panel when the carrier strap is in the wearing configuration. The vehicle strap may be connected to the carrier harness panel and the first and second shoulder straps may be disconnected from the carrier harness panel when the carrier strap is in the vehicle configuration.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings in which like numbers refer to like parts throughout and in which:

FIG. 6 is a front view of a carrier harness donned on a wearer in a "front carry" configuration;

FIG. 7 is a front view of the pet harness coupled to the carrier harness in the front carry configuration;

DETAILED DESCRIPTION OF THE INVENTION

Figure 1:
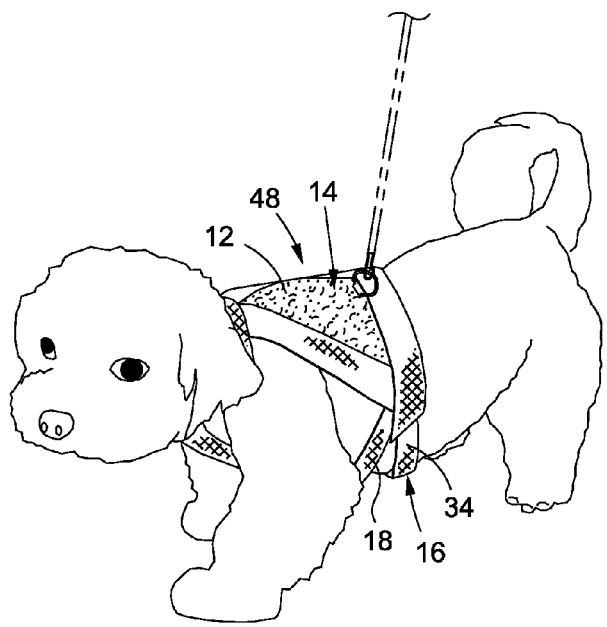
FIG. 1 is an upper perspective view of a pet harness worn by a pet.
Figure 2:
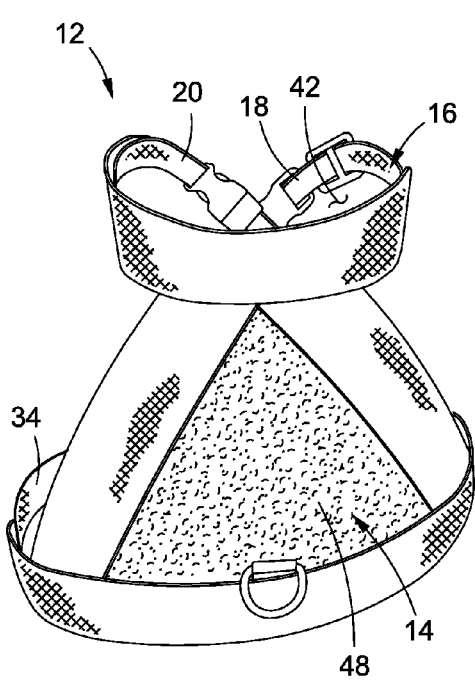
FIG. 2 is a front perspective view of the pet harness shown in FIG. 1.
Figure 3:
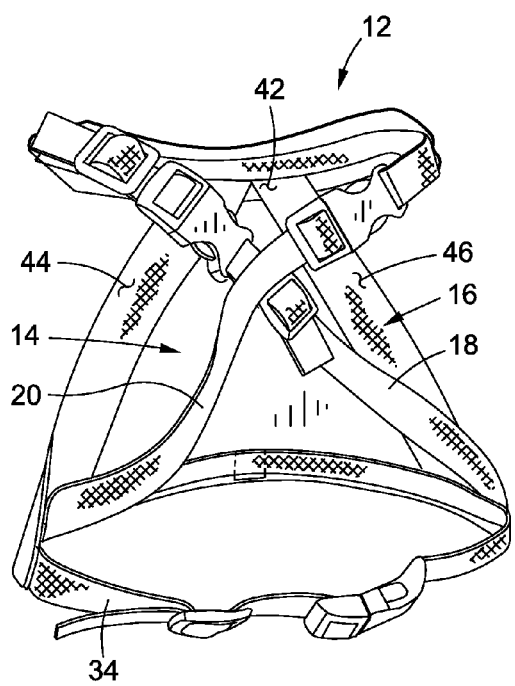
FIG. 3 is a rear perspective view of the pet harness shown in FIG. 1.
Figure 4:
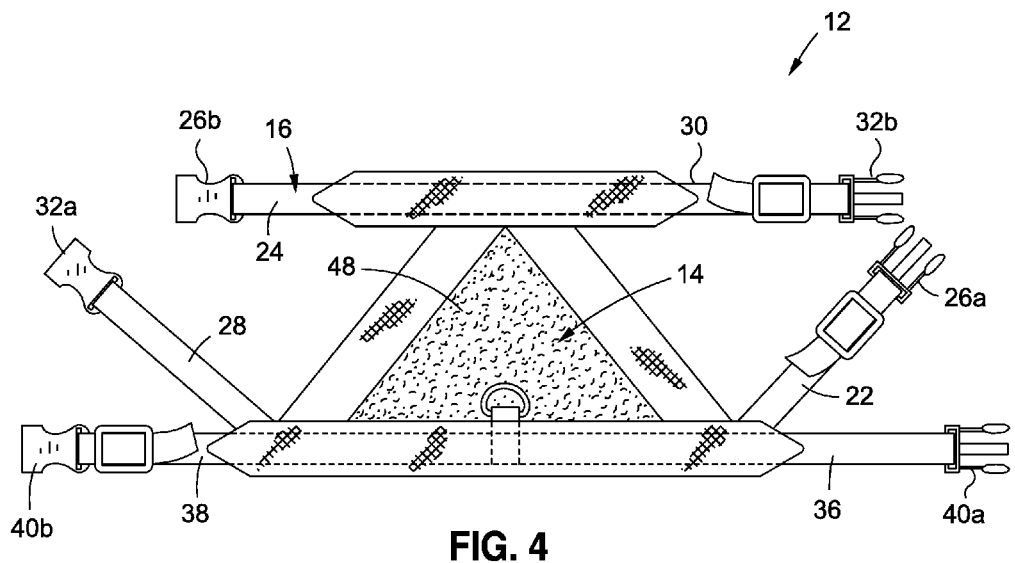
FIG. 4 is a top plan view of the pet harness.
Figure 5:
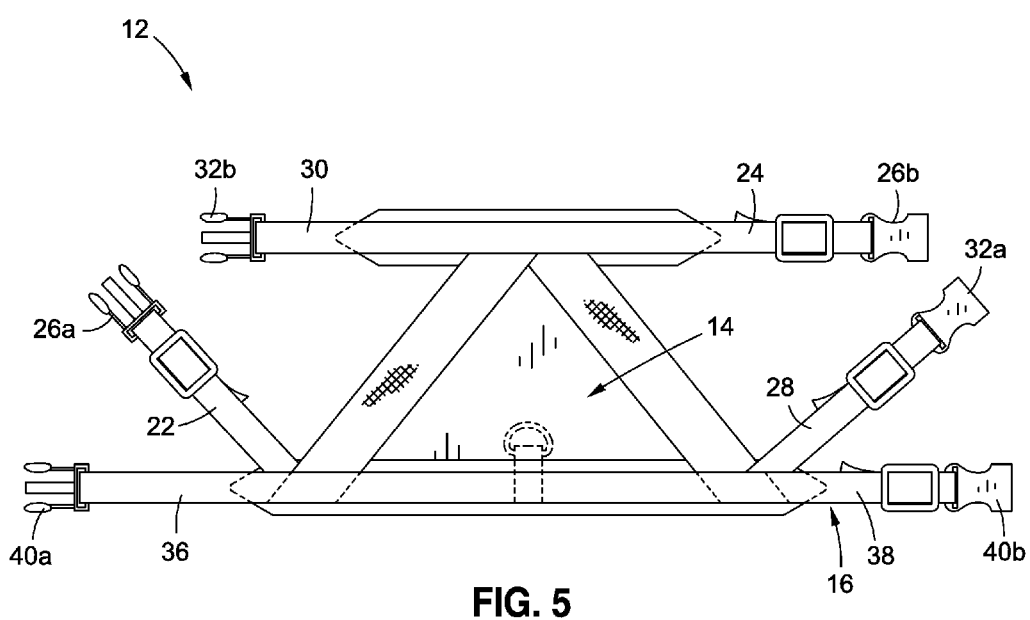
FIG. 5 is a bottom plan view of the pet harness.

The detailed description set forth below in connection with the appended drawings is intended as a description of the presently preferred embodiments of the invention, and is not intended to represent the only form in which the present devices may be developed or utilized. It is to be understood, however, that the same or equivalent functions may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Referring now to the drawings, wherein the showings are for purposes of illustrating a preferred embodiment of the present invention only, and are not for purposes of limiting the same, there is depicted a system 10 for safely carrying one's pet. The system 10 is adapted to allow for carrying of the pet on a human carrier, or for safely securing the pet within a vehicle.

According to one embodiment, the system 10 includes a pet harness 12 including a pet harness panel 14 and a pet strap 16 coupled to the harness panel 14 and configured to selectively secure the pet harness panel 14 to the pet. The pet strap 16 includes a first strap segment 18 coupled to the pet harness panel 14 to define a first loop and a second strap segment 20 coupled to the pet harness panel 14 to define a second loop in intersecting (e.g., crisscross) relation to the first loop. The first strap segment 18 includes a primary portion 22 and a secondary portion 24 selectively connected to each other via a first mechanical fastener 26a, 26b. Likewise, the second strap segment 20 includes a primary portion 28 and a secondary portion 30 selectively connected to each other via a second mechanical fastener 32a, 32b. The length of the first and second strap segments 18, 20 may be independently adjusted by adjusting the position of the respective mechanical fastener along the length of the corresponding primary and second portions. Furthermore, in the exemplary embodiment, the first and second mechanical fasteners each include a male element 26a, 32a and a female element 26b, 32b selectively engageable with the corresponding male element 26a, 32a.

The pet strap 16 additionally includes a third strap segment 34 defining a third loop. The third strap segment 34 includes a primary portion 36 and a secondary portion 38 selectively connected to each other via a third mechanical fastener 40a, 40b similar to the first and second mechanical fasteners discussed above. The length of the third strap segment 34 may be adjusted by varying the position of the third mechanical fastener 40a, 40b along the primary and secondary portions 36, 38.

The first, second, and third strap segments 18, 20, 34 are preferably formed from a woven material, such as woven nylon, although other materials known in the art may also be used. Furthermore, the size of the strap segments 18, 20, 34 and the pet harness panel 14 may be constructed in various sizes to accommodate different sized pets.

The pet harness 12 is attachable to the pet in the manner shown in FIG. 1. In particular, the first strap segment 18 extends around a first side of the pet's head and around the underside of the pet to the second side of the pet's torso. The second strap segment 20 extends around a second side of the pet's head and around the underside of the pet to the first side of the pet's torso. In this regard, the intersecting/crisscross relationship of the first and second strap segment 18, 20 define a head opening 42 through which the pet's head extends, and a pair of anterior leg openings 44, 46 through which respective ones of the pet's anterior legs extend. The third strap segment 34 is wrapped around the midsection of the pet to secure the pet harness panel 14 to the pet.

A pet harness attachment member 48 is coupled to the pet harness panel 14, and is operative to secure the pet harness 12 to a carrier harness 50, as will be described in more detail below. According to one embodiment, the pet harness attachment member 48 is hook and loop fastening material (e.g., VELCRO™) that is engageable with complimentary hook and loop fastening material coupled to the carrier harness 50.

The system 10 additionally includes a carrier harness 50 configured for use in two configurations, e.g., a wearing configuration and a vehicle configuration, as will be described in more detail below. The carrier harness 50 includes a carrier harness panel 52, an anterior support 54 coupled to the carrier harness panel 52, and a posterior support 56 coupled to the carrier harness panel 52. The posterior support 56 includes a posterior support panel 58 having a first end portion 60 and a second end portion 62, and a pair of posterior support straps 64 connecting the second end portion 62 of the posterior support panel 58 to the carrier harness panel 52. The posterior support straps 64 are spaced from each other, and the posterior support 56 is spaced from the carrier harness panel 52 to define a tail opening 66 through which the pet's tail may extend when the pet is supported by the posterior support 56. A posterior fastening element 68 is coupled to the first end portion 60 of the posterior support panel 58. According to one embodiment, the posterior support 56 and the carrier harness panel 52 are sized and configured to collectively define a pair of posterior leg openings 70, 72 sized to receive the posterior legs of the pet.

The anterior support 54 includes a pair of anterior support straps 74, 76 coupled to the carrier harness panel 52 at one end, and to an anterior fastener 78 at the other end. According to one embodiment, the pair of anterior support straps 74, 76 are arranged in a V-shaped configuration, with the open end of the "V" connected to the carrier harness panel 52, and the closed end of the "V" coupled to the anterior fastener 78.

The anterior fastener 78 is configured to be selectively engageable to the posterior fastener 68 to connect the anterior support 54 to the posterior support 56. According to one embodiment, the anterior and posterior fasteners 78, 68 are complimentary male and female fasteners, although other fastening element known in the art may also be used without departing from the spirit and scope of the present invention.

One particular implementation of the carrier harness 50 includes a middle restraint 80 coupled to the carrier harness panel 52 and configured to be extendable about the midsection of the pet. The middle restraint 50 includes a first strap portion coupled to a first side portion of the carrier harness panel, and a second strap portion coupled to a second side portion of the carrier harness panel. The middle restraint 80 is extendable about the midsection of the pet, with the first and second strap portions being securable to each other via a middle restraint fastener to secure the pet to the carrier harness panel 52. The middle restraint fastener may include complimentary hook and loop fastening material or other fastening elements known in the art (e.g., male/female elements) for connecting the first and second strap portions to each other.

A carrier harness attachment member 82 is coupled to the carrier harness panel 52 and is configured to be selectively engageable with the pet harness attachment member 48. According to one embodiment, the carrier harness attachment member 82 and the corresponding pet harness attachment member 48 are complimentary hook and loop fasteners (i.e., VELCRO™).

A carrier strap 84 is coupled to the carrier harness panel 52 and is used to secure the carrier harness 50 to the user when the carrier harness 50 is in the wearing configuration, or to secure the carrier harness 50 to the vehicle when in the vehicle configuration. According to one embodiment, the carrier strap 84 includes a first and second shoulder strap members 86, 88 coupled to the carrier harness panel 52 via respective strap connectors 90, 92. In the wearing configuration, the first and second shoulder strap members 86, 88 are wearable over the user's shoulders to transfer at least a portion of the load/weight of the pet to the wearer's shoulders. In one embodiment, the shoulder strap member 86, 88 and the strap connectors 90, 92 include complimentary male and female connectors that are selectively engageable with each other to couple the carrier strap 84 to the carrier harness panel 52. The strap connectors 90, 92 may include a connector covering which shields the pet's hair from becoming entangled when the shoulder strap members 86, 88 are connected to the strap connectors 90, 92. The connector covering may be formed from an elastic material to enable easy access to the respective connectors.

Figure 8:
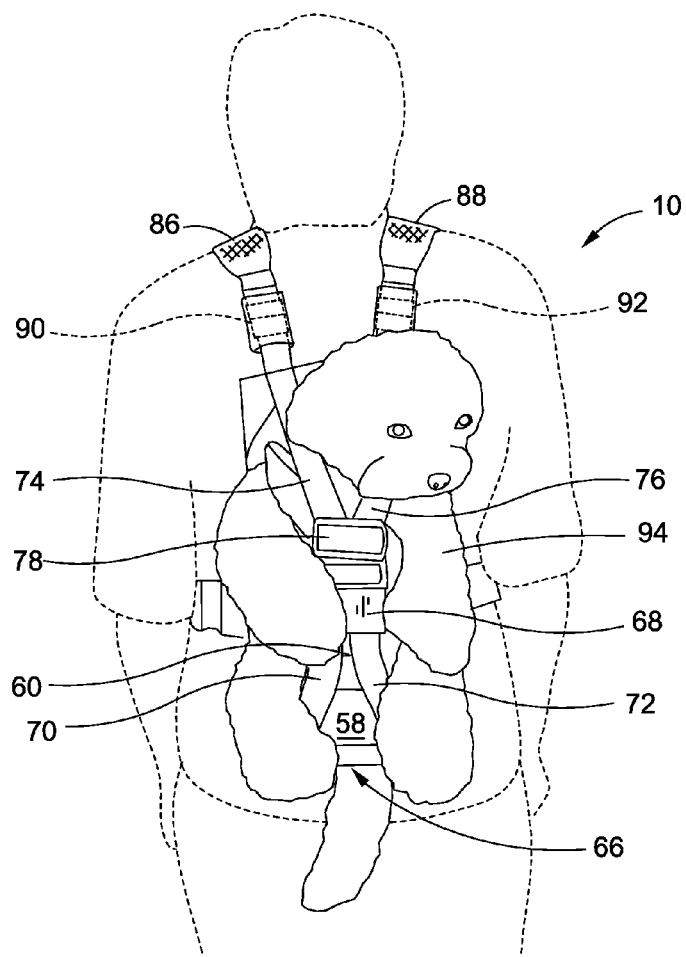
FIG. 8 is a rear view of the pet harness coupled to the carrier harness worn by the wearer in a "rear carry" configuration.
Figure 9:
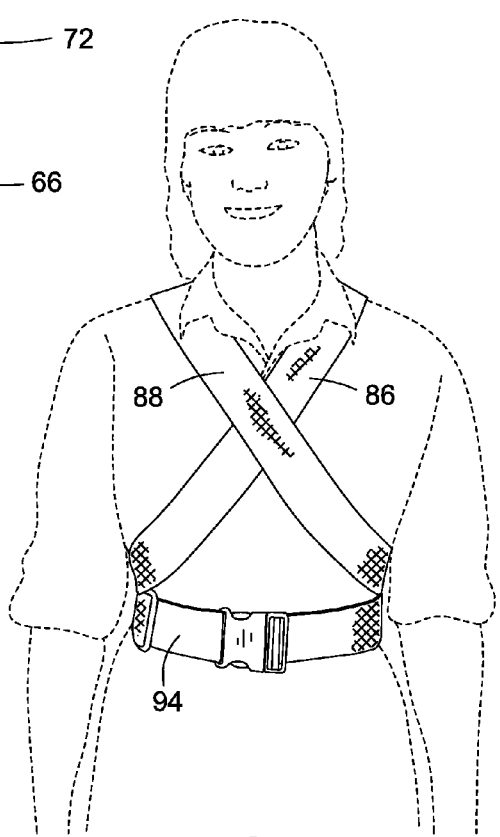
FIG. 9 is a front view of the carrier harness worn by a wearer in the rear carry configuration.

The carrier harness 50 may be worn in a "front carry" position (see FIGS. 6 and 7), wherein the pet is worn in front of the wearer (e.g., in front of the wearer's chest/stomach), or a "back carry" position (see FIGS. 8 and 9), wherein the pet is worn behind the wearer (e.g., behind the wearer's back). In the front carry position, the first and second shoulder strap members 86, 88 extend over the wearer's shoulders and extend over the wearer's back in a crisscross configuration. Conversely, in the back carry position, the first and second strap members 86, 88 extend over the user's chest in a crisscross configuration. The first and second shoulder strap members 86, 88 are configured to allow for quick and easy transition from the front carry position to the back carry position.

The carrier harness 50 may additionally include a waist strap 94 coupled to the carrier harness panel 52 and extendable about the wearer's mid-section to provide additional securement of the carrier harness 50 to the wearer.

The first and second shoulder strap members 86, 88, as well as the waist strap 94, are configured to be adjustable in length to adjust the size of the straps 86, 88, 94 to the size of the wearer. The straps 86, 88, 94 may include buckles or fasteners that are slidable along the length of the straps 86, 88, 94 to adjust the effective length of the straps 86, 88, 94. Furthermore, the first and second shoulder strap members 86, 88 and the waist strap 94 are preferably formed from a woven fabric material, such as woven nylon, although other materials known in the art may also be used.

Figure 10:
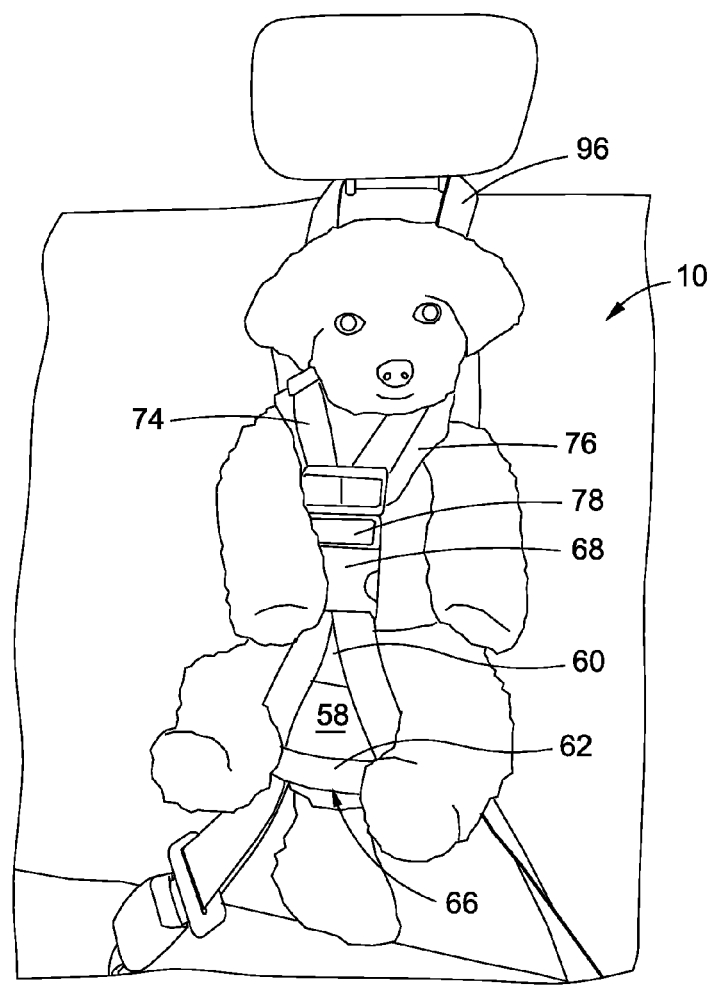
FIG. 10 is a front perspective view of the pet harness coupled to the carrier harness secured to a vehicle.
Figure 11:
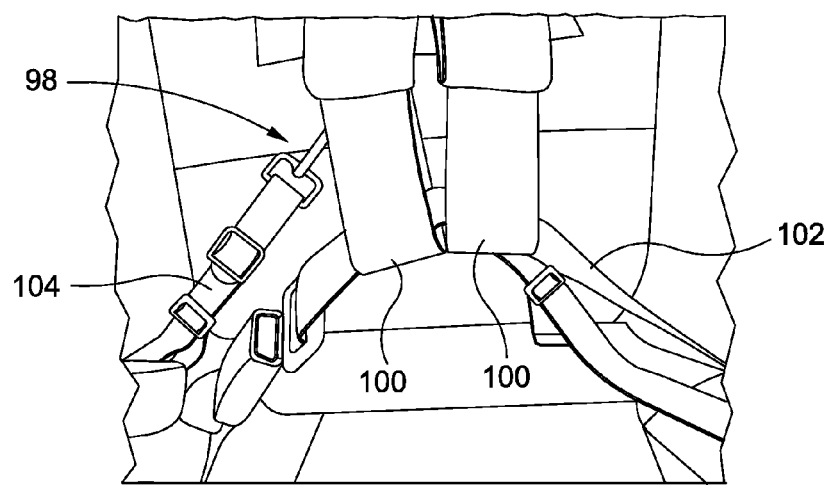
FIG. 11 is an enlarged, partial front view of vehicle connecting straps for securing the carrier harness to the vehicle.

As noted above, and referring now to FIGS. 10 and 11, the carrier harness 50 is additionally securable to a vehicle for supporting the pet in the vehicle. A vehicle strap 96 is connected to the carrier harness panel 52 via the strap connectors 90, 92. In this regard, the vehicle strap 96 includes a first end portion coupled to a first strap connector 90 and a second end portion connected to a second strap connector 92. When the carrier harness 50 is connected to the vehicle, the first and second shoulder strap members 86, 88 are preferably detached from the strap connectors 90, 92.

According to one aspect of the present invention, the carrier harness 50 additionally includes a posterior vehicle connector 98 coupled to the carrier harness panel 52 and engageable with the vehicle. In one embodiment, the posterior vehicle connector 98 includes one or more loops 100 coupled to the carrier harness panel 52 and defining an opening sized to allow a seatbelt 102 to pass through the one or more loops 100 for securing the carrier harness 50 to the vehicle.

In another embodiment, the posterior vehicle connector 98 includes an anchor strap 104 coupled to the carrier harness panel 52 and connectable to an anchor bracket in the vehicle. Such anchor brackets are commonly located behind the rear seats, and are regularly used to anchor children's car seats. The anchor strap 104 may include a clip or other fasteners known by those skilled in the art for securing the anchor strap 104 to the anchor bracket.

With the general structural features of the pet carrying system 10 discussed above, the following will focus on use of the system 10. The pet harness 12 is secured to the pet by connecting the first and second strap segments 18, 20 such that the first and second strap segments 18, 20 crisscross across the underside of the pet, with the pet's head extending through the head opening 42, and the anterior legs of the pet extend through the anterior leg openings 44, 46. The third strap segment 34 is secured around the pet adjacent the midsection of the pet (e.g., between the pet's anterior legs and posterior legs). When the pet harness 12 is properly secured the pet, the pet harness panel 14 is positioned over the pet's back. Furthermore, the first, second, and third strap segments 18, 20, 34 are adjusted such that the pet harness 12 cannot easily slip off the pet.

If the user desires to wear the pet in a front carry position, the user dons the carrier harness 50 such that the carrier harness panel 52 is positioned over the user's chest/abdomen. The first and second shoulder strap members 86, 88 extend over the wearer's shoulders and crisscross over the wearer's back. Furthermore, the waist strap 94 is extended around the wearer's waist. The first and second shoulder strap members 86, 88, as well as the waist strap 94 are adjusted to conform to the particular size and comfort level of the wearer.

The carrier harness 50 is then readied for connection of the pet harness 12 thereto. In this regard, the anterior support straps 74, 76 are preferably tucked behind the carrier harness panel 52 and the middle restraint 80 is opened to make way for the pet and the pet harness 12.

The pet is carefully lifted and moved into position adjacent the carrier harness 50. In this regard, the pet harness attachment member 48 is connected to the carrier harness attachment member 82 to initially secure the pet harness 12 to the carrier harness 50. The attachment members 48, 82 are preferably configured to maintain connection between the pet harness 12 and the carrier harness 50 without additional support by the wearer's arms. Some embodiments include optional safety clips coupled to the pet harness 12 which connect with optional safety rings on the carrier harness 50 to provide additional connection between the pet harness 12 and the carrier harness 50.

The middle restraint 80 is then secured over the pet between the anterior and poster legs of the pet to further secure the pet in place. According to one embodiment, the middle restraint 80 includes a strap coupled to a first side portion of the carrier support panel 52, wherein the strap includes a first fastening element connected to a distal portion of the strap. A second fastening element is connected to the second side portion of the carrier support panel 52 and is selectively engageable with the first fastening element. The first and second fastening elements may include complimentary male and female fasteners, although other fastening elements known in the art may also be used. Furthermore, an elastic cover may be connected to the first and/or second fastening elements to protect against the pet's hair becoming entangled in the fastening elements. In another embodiment, the middle restraint 80 may include a first end that is fixed/attached to the carrier support panel 52 adjacent a first side portion of the carrier support panel 52, and a second end portion that is free and passes through a hook or loop coupled to a second side portion of the carrier support panel 52. The middle restraint 80 may include a hook and loop fastener for securing onto itself when the middle restraint 80 is tightened around the pet. It is also contemplated that in other embodiments, the middle restraint may include two separate strap portions that are connected to each other via a fastener or buckle.

The pet's posterior region is then secured within the carrier harness 50. In this regard, the posterior support 56 is positioned over the pet by passing pet's tail through the tail opening 66, and the pet's posterior legs through respective ones of the pair of posterior leg openings 70, 72. The posterior support 56 may include a posterior support panel 58 that extends between the pet's posterior legs.

The anterior support 54 is lowered toward the posterior support 56 by lowering the anterior support straps 74, 76 around the pet's head. The anterior support 54 is then coupled to the posterior support 56 via the anterior and posterior fasteners 78, 68, which are coupled to each other.

With the pet secured in the pet carrying system 10, the user is free to walk around without the need to support the pet with the user's arms, and the pet can remain safely secured within the pet carrying system 10 and can view in front of the wearer to easily see the surroundings.

The use of the pet carrying system 10 in the rear carry position is similar to the use of the pet carrying system 10 in the front carry position, except that the carrier harness 50 is worn with the carrier harness panel 52 disposed over the wearer's back, and the first and second shoulder strap members 86, 88 extend over the wearer's chest in a crisscross configuration. The pet carrying system 10 can be used in the rear carry configuration without any additional assistance by setting up the system 10 in the front carry configuration and then carefully sliding the system 10 around the wearer to the back carry configuration. Alternatively, another person (i.e., separate from the wearer) may connect the pet harness 12 to the carrier harness 50 worn by the wearer in the back carry position.

As noted above, the pet carrying system 10 may also be used in a vehicle to support the pet within the vehicle. The carrier harness 50 is readied for connection with the vehicle by removing the first and second shoulder strap members 86, 88 and connecting a vehicle strap 96 to the carrier harness panel 52 by the strap connectors 90, 92. The vehicle strap 96 is extended around the headrest of the vehicle seat and is adjusted such that the carrier harness panel 52 is elevated over the bottom seat surface.

The bottom portion of the carrier harness panel 52 is secured to the vehicle, either by passing the seatbelt 102 through the seatbelt loops 100, and/or by connecting the anchor straps 104 to the anchor brackets connected to the vehicle.

When the carrier harness 50 is secured to the vehicle, the pet harness 12, which is already secured to the pet, may be connected to the carrier harness 50 in the same manner described above in relation to the wearing configuration.

It is contemplated that the pet safety system 10 may include several additional optional components/features which provide additional comfort or protection to the pet secured therein. According to one embodiment, the pet carrying system 10 includes a protective covering 106 selectively connectable to the carrier harness panel 52 and configured to be disposable over the pet to cover a portion of the pet. The protective covering 106 includes a covering panel 108 defining a covering periphery which is adjustable to conform to the size of the pet. The covering panel 108 may be secured to the carrier harness panel 52 via one or more snap fasteners, hook and loop fasteners, magnets or other fastening elements known in the art. The covering panel 108 may include a draw string adjacent at least a portion of the outer periphery thereof for cinching the covering panel 108 around the pet. A hood 110 may be selectively connectable to the covering panel 108 and disposable over the head of the pet.

Figure 12:
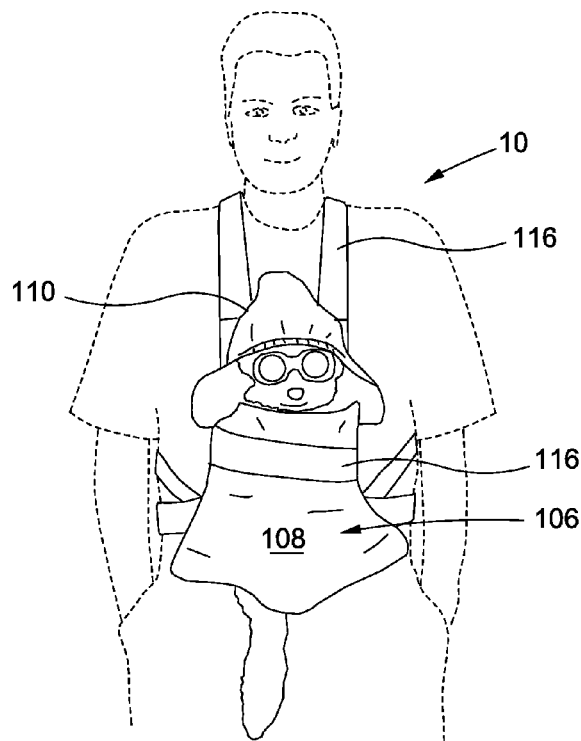
FIG. 12 is a front perspective view of a protective covering connected to the carrier harness to cover the pet.
Figure 13:
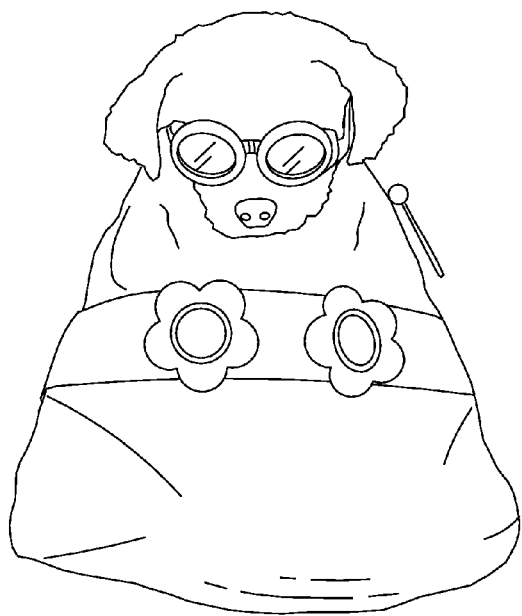
FIG. 13 is an enlarged front view of the protective covering positioned over the pet.
Figure 14:
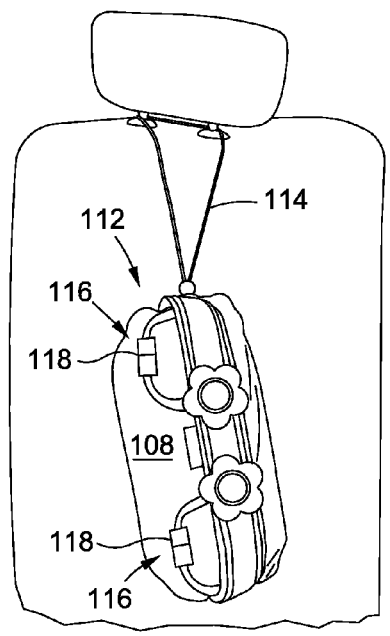
FIG. 14 is a front perspective view of the protective covering in a storage configuration.

The covering panel 108 may be connectable to itself to define a bag 112 for storing the pet safety system 10 during periods of non-use. In this regard, the covering panel 108 is selectively transitional between its covering configuration, wherein it is securable to the carrier harness panel 52 and adjustable to cover the pet (as shown in FIGS. 12 and 13), and a bag configuration, wherein the covering panel 108 connects to itself, via snaps, fasteners or the like, the define an internal storage compartment for storage of the pet harness 12 and the carrier harness 50. As shown in FIG. 14, the drawstring 114 may be used to hang the bag 112 over the headrest or other supports known in the art.

It is also contemplated that the bag 112 may be configured to facilitate transport thereof by the pet owner. Along these lines, the bag 112 may include auxiliary straps 116 connected to the covering panel 108. In one embodiment, the auxiliary straps 116 include a detachable buckling element 118 (e.g., male and female buckling elements) which selectively connects two strap portions. The auxiliary straps 116 may be connected to a belt strap or to another anchoring device to allow for easy transport of the system 10.

Furthermore, it is contemplated that the bag 112 may include a pair of drawstrings 114 to allow the user to wear the bag 112 in the bag configuration around the user's shoulders (similar to wearing a backpack). Each drawstring 114 may extend from a respective end portion of the bag 112 for ease of wearing.

The pet carrying system 10 may additionally include reflective material coupled to the shoulder straps 86, 88 and/or the covering panel 108 to enhance the overall safety of the system 10.

Certain embodiments of the system 10 may additionally include an extension strap which is connectable with the waist strap or shoulder strap to enlarge the effective size of the straps. The extension strap may include complimentary fasteners which are selectively engageable with the fasteners on the waist strap or shoulder straps. The extension strap may also be configured to connect with the carrier support panel and extend around a car seat (such as a bucket seat or a bench seat having an exposed back) to provide additional support to the carrier harness when the carrier harness is in the vehicle configuration. This may be particularly beneficial for larger, heavier dogs, so as to distribute the weight supported by the system 10.

Although the foregoing describes the carrier harness as 50 as being capable of serving the dual purposes of being worn by a user in a wearing configuration, as well as being connected to a vehicle in a vehicle configuration, it is also contemplated that other embodiments of the system may include a wearing harness and a separate vehicle harness. In this regard, the two harnesses may be more specifically tailored to perform the particular function they serve. Along these lines, the shoulder straps may be more permanently connected to the wearing harness, and the vehicle connector may be more permanently connected to the vehicle harness because the adaptability between the above-described wearing configuration and vehicle configuration may not be necessary. Furthermore, any additional buckles, straps or connectors not needed for the particular harness may be removed. For instance, the waist strap and corresponding waist strap connectors may be removed from the vehicle harness.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combinations described herein. Thus, the scope of the claims is not to be limited by the illustrated embodiments.

What is claimed is:

1. A pet carrying system for carrying a pet by a wearer and securing the pet in a vehicle, the pet carrying system comprising:
   a pet harness comprising:
      a pet harness panel;
      a pet strap coupled to the harness panel and having at least one segment configured to form an enclosed loop around a torso of the pet to selectively secure the pet harness panel to the pet; and
      a pet harness attachment member coupled to the pet harness panel;
   a carrier harness selectively and detachably securable to the pet harness, the carrier harness comprising:
      a carrier harness panel;
      a carrier harness attachment member coupled to the carrier harness panel and configured to be selectively and directly engageable with the pet harness attachment member;
      a posterior support coupled to the carrier harness panel and configured to support a posterior portion of a pet secured by the carrier harness;
      an anterior support coupled to the carrier harness panel and engageable with the posterior support; and
      a carrier strap coupled to the harness panel and configured to be transitional between a wearing configuration, wherein the carrier strap is worn by a wearer, and vehicle configuration, wherein the carrier strap is secured to the vehicle;
   the pet harness being configured to be wearable individually by the pet and separate from the carrier harness.

2. The pet carrying system recited in claim 1, further comprising a middle restraint coupled to the carrier harness panel and configured to be extendable around a mid-section of the pet to secure the pet to the carrier harness.

3. The pet carrying system recited in claim 1, wherein in the wearing configuration, the carrier strap is transitional between a front wearing configuration, wherein the carrier harness panel is positioned over a wearer's chest, and a back wearing configuration, wherein the carrier harness panel is positioned over a wearer's back.

4. The pet carrying system recited in claim 1, further comprising a waist strap coupled to the carrier harness panel, the waist strap being extendable about the wearer's mid-section to secure the carrier harness to the wearer.

5. The pet carrying system recited in claim 1, further comprising a posterior vehicle connector coupled to the carrier harness panel in spaced relation to the carrier strap and engageable with the vehicle to secure the carrier harness to the vehicle.

6. The pet carrying system recited in claim 5, wherein the posterior vehicle connector includes a seat belt loop coupled to the carrier harness panel and configured to define an opening sized to receive the vehicle seat belt.

7. The pet carrying system recited in claim 5, wherein the posterior vehicle connector includes an anchor strap coupled to the carrier harness panel and securable to an anchor in the vehicle.

8. The pet carrying system recited in claim 1, further comprising a protective covering selectively connectable to the carrier harness panel and configured to be disposable over the pet to cover a portion of the pet.

9. The pet carrying system recited in claim 8, wherein the protective covering includes a covering panel defining a covering periphery, the covering periphery being adjustable to conform to the size of the pet.

10. The pet carrying system recited in claim 8, further comprising a hood selectively connectable to the protective covering and disposable over the head of the pet.

11. The pet carrying system recited in claim 1, wherein the pet strap includes a first looped segment adapted to circumnavigate the pet's neck and a second looped segment adapted to circumnavigate the pet's midsection.

12. The pet carrying system recited in claim 1, wherein the posterior support and the carrier harness panel collectively define a pair of posterior leg openings sized to receive the posterior legs of the pet.

13. The pet carrying system recited in claim 12, wherein the posterior support and the carrier harness panel collectively define a tail opening between the pair of posterior leg openings sized to receive the tail of the pet.

14. The pet carrying system recited in claim 1, wherein the anterior support defines an opening sized to allow the head of the pet to be advanced therethrough.

15. The pet carrying system recited in claim 1, wherein the pet harness attachment member defines a first attachment face and the carrier harness attachment member defines a second attachment face, the first attachment face being disposed in contact with the second attachment face when the pet harness attachment member is engaged to the carrier harness attachment member.

16. The pet carrying system recited in claim 1, wherein the carrier strap includes:
   first and second shoulder straps selectively connectable to the carrier harness panel; and
   a vehicle strap connectable to the carrier harness panel;
   the first and second shoulder strap being connected to the carrier harness panel and the vehicle strap being disconnected from the carrier harness panel when the carrier strap is in the wearing configuration;
   the vehicle strap being connected to the carrier harness panel and the first and second shoulder straps being disconnected from the carrier harness panel when the carrier strap is in the vehicle configuration.

17. A pet carrying system for carrying a pet by a wearer and securing the pet in a vehicle, the pet carrying system comprising:
   a pet harness comprising:
      a pet harness panel configured to be selectively securable to the pet; and
      a pet harness attachment member coupled to the pet harness panel;
   a carrier harness selectively and detachably securable to the pet harness, the carrier harness comprising:
      a carrier harness panel;
      a carrier harness attachment member coupled to the carrier harness panel and configured to be selectively engageable with the pet harness attachment member;
      a posterior support coupled to the carrier harness panel and configured to support a posterior portion of a pet secured by the carrier harness;
      an anterior support coupled to the carrier harness panel and engageable with the posterior support; and
      the carrier harness configured to be transitional between a wearing configuration, wherein the carrier harness is worn by a wearer, and vehicle configuration, wherein the carrier harness is secured to the vehicle;
   the pet harness being configured to be wearable individually by the pet and separate from the carrier harness.

18. The pet carrying system recited in claim 17, further comprising a middle restraint coupled to the carrier harness panel and configured to be extendable around a mid-section of the pet to secure the pet to the carrier harness.

19. The pet carrying system recited in claim 17, further comprising a posterior vehicle connector coupled to the carrier harness panel in spaced relation to the carrier strap and engageable with the vehicle to secure the carrier harness to the vehicle.

20. The pet carrying system recited in claim 17, wherein the pet harness attachment member defines a first attachment face and the carrier harness attachment member defines a second attachment face, the first attachment face being disposed in contact with the second attachment face when the pet harness attachment member is engaged to the carrier harness attachment member.

\* \* \* \* \*